March 1, 1932.  G. L. HISE  1,847,185
TESTING APPARATUS
Filed May 7, 1929   2 Sheets-Sheet 1
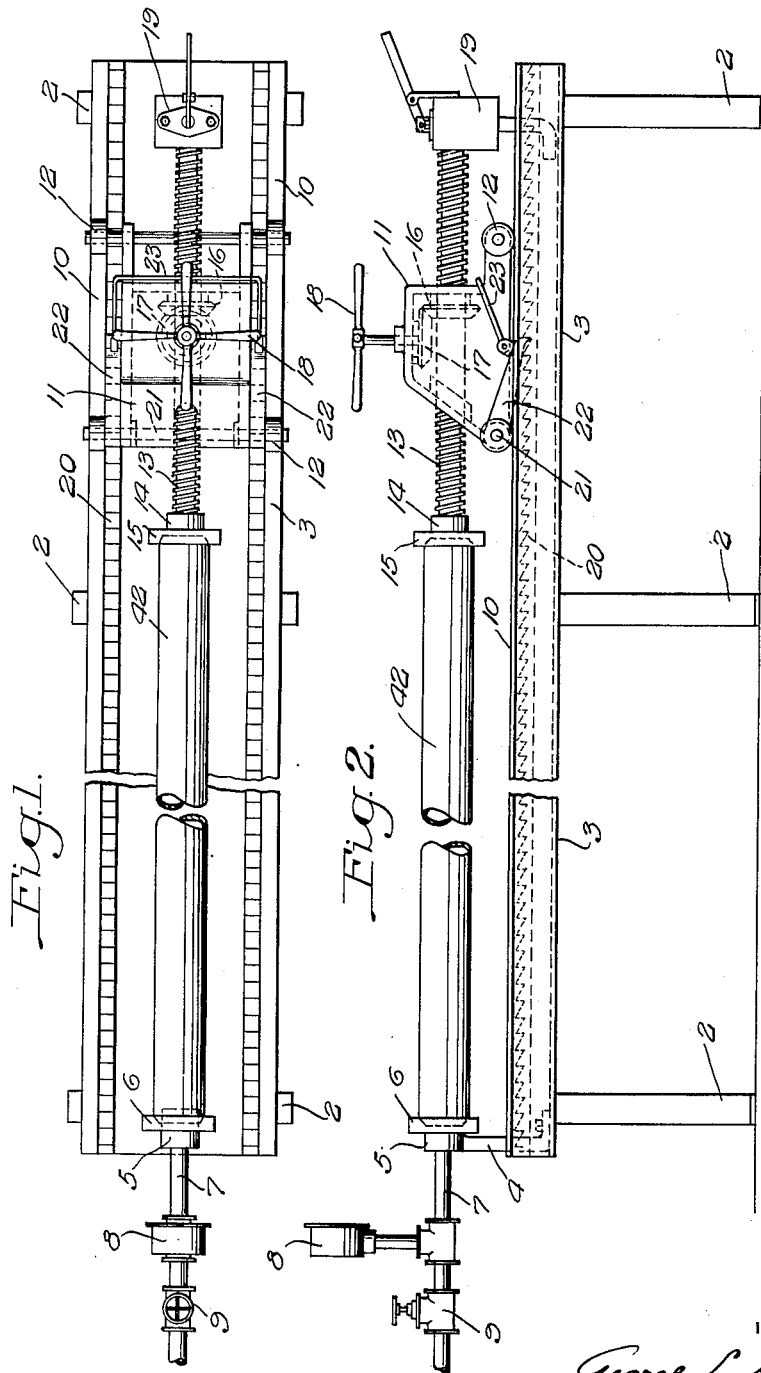
INVENTOR
George L. Hise
by Byrnes, Stebbins & Parmelee
his Attys.

March 1, 1932. G. L. HISE 1,847,185
TESTING APPARATUS
Filed May 7, 1929 2 Sheets-Sheet 2
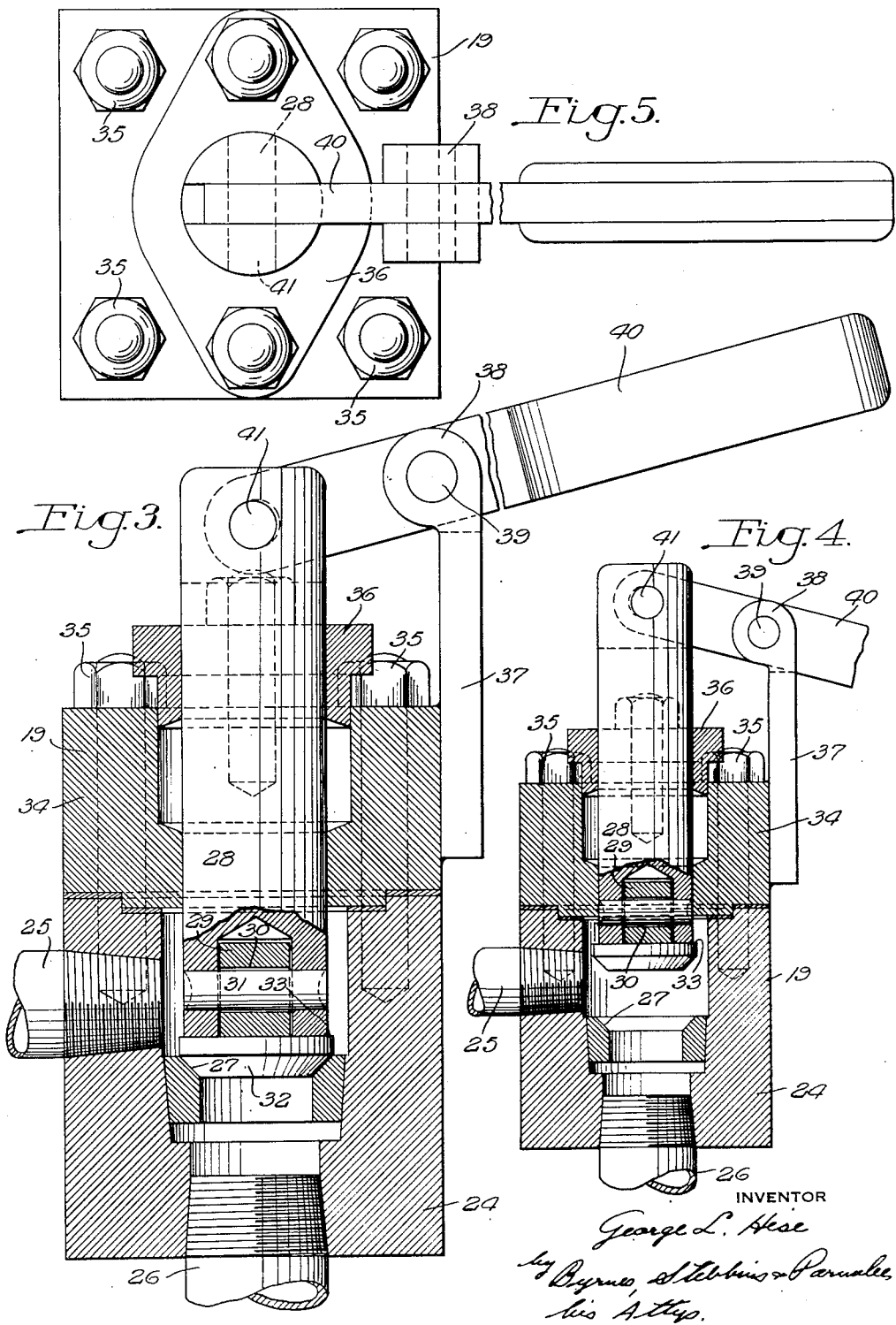
INVENTOR
George L. Hise
by Byrne, Stebbins & Parmelee,
his Attys.

Patented Mar. 1, 1932

1,847,185

UNITED STATES PATENT OFFICE

GEORGE L. HISE, OF AMBRIDGE, PENNSYLVANIA, ASSIGNOR OF ONE-HALF TO BENJAMIN LASSMAN, OF PITTSBURGH, PENNSYLVANIA

TESTING APPARATUS

Application filed May 7, 1929. Serial No. 361,106.

This invention relates to testing apparatus and more particularly to apparatus adapted to testing products by the application of fluid under pressure. It relates still more particularly to the combination of such testing apparatus and valve means for sustaining and relieving the testing pressure.

The invention is particularly applicable to the testing of pipe to determine whether its strength complies with standard requirements. This is done by introducing fluid under pressure into a pipe section, confining the fluid therein, and building up the pressure to a predetermined value. If the pipe section withstands the pressure it may be regarded as satisfactory.

Testing apparatus of the type referred to is ordinarily used in pipe mills to test lengths of pipe as soon as they come from the finishing rolls and have been sufficiently cooled. It has heretofore been customary to connect the ends of a pipe section with a fluid conduit, fluid being admitted from one end, and to confine the fluid by means of a valve in the opposite end and build up the pressure within the pipe section. After the pressure has been built up to the predetermined value, the source of fluid must be cut off and the pressure within the pipe section relieved by opening the valve at the discharge end of the testing apparatus. This same operation must be carried out for each section that is tested, and the operation has consumed considerable time with devices commonly in use by reason of the necessity of closing and opening the pressure sustaining and relieving valve for each pipe section tested. Time is required to turn the valve handle and move the valve toward or away from its seat through the agency of a threaded stem. Furthermore, such valves have been found to be unsatisfactory to a certain extent by reason of leakage under the heavy pressure and difficulty of operation brought about principally because of the large size of valve necessitated to sustain the high testing pressure. In addition, such valves become easily clogged by dirt, scale, steel cuttings and the like which are washed out of the pipe. On account of such dirt, scale, steel cuttings and the like, valves previously used have given short life because their seats have been cut and scored, causing excessive leakage, and have required unnecessarily frequent repair and renewal. By reason of its construction, the valve of the present invention gives considerably longer service without repair or replacement of parts.

I provide a testing apparatus in which I incorporate a valve adapted to obviate the various disadvantages above noted. The valve is preferably approximately balanced when closed so that a relatively small force is required to open the same even against the high pressure of the testing fluid. The valve is preferably lever operated so that by a single hand motion of the lever, which requires a relatively small force due to the approximate balance of the valve, it may be quickly opened to relieve the pressure and a succeeding section may be immediately substituted for that just tested. The valve is simple in construction, does not easily get out of order, is strong enough to withstand the pressure exerted and is very cheap to manufacture.

It is not asserted that the valve used according to the present invention is broadly new. Balanced valves broadly are old and no claim is made here to the valve construction itself. The application of a valve such as is herein contemplated is, however, so far as I am advised, new with respect to pressure testing machines of the type referred to. Advantages are attained which are not attained in an ordinary application of a balanced valve. The combination of the pressure testing apparatus and the valve brings about the results above noted, whereas with valves heretofore in use on such testing machines the disadvantages referred to have not been obviated.

Other objects and advantages of the invention will become apparent as the following description of a present preferred embodiment thereof proceeds. In the accompanying drawings I have shown a present preferred embodiment of the invention, wherein Figure 1 is a plan view of a testing apparatus;

Figure 2 is an elevation of the apparatus shown in Figure 1;

Figure 3 is a cross section through a valve showing it in closed position;

Figure 4 is a cross section to reduced scale through the valve shown in Figure 3 but showing it in open position; and Figure 5 is a top plan view of the valve shown in Figures 3 and 4.

Referring more particularly to the drawings, and to Figures 1 and 2 thereof, reference numeral 2 designates a series of supports upon which is carried a bed 3. Connected at one end of the bed 3 is an upright 4 terminating in a collar 5 to which is connected a beveled packing member 6. The collar 5 and packing member 6 are connected with a fluid conduit 7 having a pressure gauge 8 and a control valve 9.

Disposed on the bed 3 are tracks 10 upon which is mounted a carriage 11. The carriage 11 is provided with wheels 12 adapted to cooperate with the tracks 10 so that the carriage can move longitudinally of the bed 3.

Passing through the carriage 11 is a hollow screw 13 terminating at one end in a collar 14, to which is connected a packing member 15 similar to the packing member 6, the screw 13 passing through an operating gear 16 which upon rotation causes axial movement of the screw. The member 16 is geared to a bevel gear 17 controlled by a hand wheel 18. At the end of the screw 13 opposite the packing member 15 is a valve designated generally in Figures 1 and 2 by reference numeral 19, but more fully illustrated in Figures 3, 4 and 5, and to be presently described in detail.

Connected with the bed 3 is a pair of oppositely disposed racks 20. Pivotally connected with an axle 21 of the carriage 11 is a pair of pawls 22, one above each rack 20 and adapted to engage the teeth of the rack as shown in Figure 2. The respective pawls 22 are connected by a U-shaped member 23, by which they are adapted to be simultaneously raised to disengage them from the respective racks.

Referring now more particularly to Figures 3, 4 and 5, there is shown a valve 19 comprising a body 24 having an inlet 25 and an outlet 26. Above the outlet 26 is a valve seat 27 with which cooperates a valve stem 28. The stem 28 comprises a body member having a recess in its bottom in which is received a lug 29 having a hole 30. Coaxial with the hole 30 is a hole through the valve stem 28, and a pin 31 is passed through the respective holes in the lug and stem to maintain a seat engaging portion 32, which is integral with the lug portion 29, connected with the stem 28. The pin 31 allows the portion 32 of the valve to align itself with the seat 27 so that a true seating of the valve is at all times insured. This is because of the fact that the hole 30 is a little larger in diameter than the pin 31, and the lug 29 is of smaller diameter than the recess into which it fits, such loose fit providing sufficient looseness to permit true seating of the valve.

The portion 32 is of slightly greater diameter than the stem body 28 and forms a small ledge or unbalanced area 33 surrounding the stem, the surface of such ledge being so disposed that the pressure within the valve tends to maintain the stem seated. On account of the very small area of the ledge 33, however, the seating tendency is slight and the valve is approximately balanced. When there is pressure within there is just sufficient tendency towards seating of the valve that it is firmly maintained in closed position to avoid loss of pressure or fluid.

The valve is closed by a bonnet 34 connected to the body 24 by bolts 35, and the stem is sealed by a packing member 36. Connected to the valve bonnet is a post 37 having at its upper portion a yoke 38 within which is pivoted at 39 a handle 40. The extremity of the handle 40 is pivoted at 41 to the upper portion of the valve stem 28.

The operation of the testing apparatus is as follows. A pipe section 42 is conveyed by an overhead crane or other suitable means to the testing apparatus and is positioned between the respective packing members 6 and 15. One end of the pipe section 42 is placed firmly against the packing member 6 and the carriage 11 is then advanced until the packing member 15 seals the opposite end of the pipe section. The pawls 22 prevent movement of the carriage to the right, viewing Figures 1 and 2, and by movement of the hand wheel 18, the screw 13, carrying the packing member 15, is tightened to the required degree so as to establish a firm fluid-tight connection with both ends of the pipe section.

The valve 19, which is connected with the end of the hollow screw 13, is opened, and the valve 9 is also opened to admit fluid, such as water, into the conduit 7 and through the pipe section 42 and the screw 13. Any dirt, scale, steel cuttings and the like, as well as the air which is within the pipe section, are swept out and pass through the valve 19. When substantially all of the air and foreign matter have been expelled and the pipe section is substantially full of flowing water, the valve 19 is closed by raising the handle 40 and the valve 9 is opened wider until the required pressure is built up within the pipe section. The pressure is observed by means of the gauge 8. If the pipe section withstands the predetermined testing pressure, it is satisfactory as regards strength, but if it should fail before the ultimate pressure is reached, it is rejected.

After the pipe section has been tested, the valve 9 is closed to shut off the source of pressure, and by a single hand movement the valve 19 is opened. Although a very high pressure may be built up within the system, a relatively small force is required to open the valve on account of the fact that the small area provided by the ledge 33 is the only area upon which the pressure may be effective for maintaining the valve in closed position. One quick movement of the hand is sufficient to throw the valve 19 open, and the water passes out through the outlet 26.

By the use of the combination above described the capacity of the testing apparatus may be very materially increased due to the much greater speed with which the pipe sections may be tested. The valve 9 may, if desired, be of the same type as the valve 19, although quick operation of the valve 9 is not so essential inasmuch as more time is available for shutting off the source of water than is available for emptying the pipe section and backing away on the screw 13. It does not matter if some water is lost during this operation, but if the backing away were commenced before the valve 19 were opened, the water would squirt out past the packing members 6 and 15, possibly injuring the workmen or at least wetting them.

The valve shown in Figures 3, 4 and 5 has an additional advantage when applied to a testing machine of the type described in that a free and unobstructed passage is provided, not only for the water passing through the valve, but also for air, dirt, scale, steel cuttings and other foreign matter which is washed out from the interior of the pipe. It is important that a free passage be provided for such foreign matter, as in the constructions heretofore used the valves have frequently become clogged and have required very frequent attention and cleaning.

Thus the provision of the valve disclosed in combination with a pressure testing machine has the advantages of positive and quick operation, providing a clear and unobstructed passage for water and foreign matter, easy operation against high pressure, requisite strength and cheapness of manufacture. These advantages, as above pointed out, arise by virtue of the combination claimed and are not inherently to be found in any similar construction in which the combination called for is not present.

While I have shown and described a present preferred embodiment of the invention, it is to be distinctly understood that the same is not limited thereto but may be otherwise variously embodied within the scope of the following claim.

I claim:

In pressure testing apparatus, a fluid conduit having a stationary portion and a movable portion between which a specimen is adapted to be connected, and valve means on the movable portion for sustaining and relieving the pressure in the conduit, such valve means being lever operated and being approximately balanced while sustaining the pressure in the conduit so that the pressure may be quickly relieved by a single hand movement of the lever and with the application of only a relatively small force, even though the pressure in the conduit be relatively great.

In testimony whereof I have hereunto set my hand.

GEORGE L. HISE.